United States Patent
Sun et al.

(10) Patent No.: US 10,856,094 B2
(45) Date of Patent: Dec. 1, 2020

(54) METHOD AND DEVICE FOR SOUND SOURCE LOCALIZATION

(71) Applicants: NANJING TWIRLING TECHNOLOGY CO., LTD., Nanjing (CN); BEIJING TWIRLING IN TIME CO., LTD., Beijing (CN)

(72) Inventors: Xuejing Sun, Rochester, MI (US); Xingtao Zhang, Beijing (CN); Chen Zhang, Beijing (CN)

(73) Assignees: NANJING TWIRLING TECHNOLOGY CO., LTD., Nanjing (CN); BEIJING TWIRLING IN TIME CO., LTD., Beijing (CN)

( * ) Notice: Subject to any disclaimer, the term of this patent is extended or adjusted under 35 U.S.C. 154(b) by 0 days.

(21) Appl. No.: 16/515,036

(22) Filed: Jul. 18, 2019

(65) Prior Publication Data

US 2019/0342688 A1 Nov. 7, 2019

Related U.S. Application Data

(63) Continuation-in-part of application No. PCT/CN2017/072014, filed on Jan. 22, 2017.

(51) Int. Cl.
*H04S 3/02* (2006.01)
*H04R 3/00* (2006.01)
(Continued)

(52) U.S. Cl.
CPC .............. *H04S 3/02* (2013.01); *H04R 3/005* (2013.01); *H04R 3/04* (2013.01); *H04R 5/04* (2013.01);
(Continued)

(58) Field of Classification Search
CPC . H04R 3/04; H04R 5/04; H04R 3/005; H04R 5/027; H04R 29/004; H04R 29/005;
(Continued)

(56) References Cited

U.S. PATENT DOCUMENTS

2009/0310144 A1* 12/2009 Jung ...................... G03B 21/00
356/601
2012/0183149 A1* 7/2012 Hiroe ...................... G10L 25/48
381/56
(Continued)

FOREIGN PATENT DOCUMENTS

CN          1832633 A       9/2006
CN        101272168 A       9/2008
(Continued)

*Primary Examiner* — Disler Paul
(74) *Attorney, Agent, or Firm* — Bayramoglu Law Offices LLC

(57) ABSTRACT

A method and an apparatus for locating a sound source are provided. The method includes: obtaining M channels of audio signals of a preset format by microphone arrays located in different planes (S100); preprocessing the M channels of audio signals of the preset format, and projecting them onto the same plane, so as to obtain N channels of audio signals, where M≥N (S200); performing a time-frequency transformation on each of the N channels of audio signals, so as to obtain frequency domain signals of the N channels of audio signals (S300); further calculating a covariance matrix of the frequency domain signals and performing a smoothing process (S400); performing an eigenvalue decomposition of the smoothed covariance matrix (S500); estimating the sound source direction according to an eigenvector corresponding to the maximum eigenvalue, so as to obtain a sound source orientation parameter (S600).

8 Claims, 6 Drawing Sheets

(51) Int. Cl.
*H04R 3/04* (2006.01)
*H04R 5/04* (2006.01)

(52) U.S. Cl.
CPC ....... *H04S 2400/03* (2013.01); *H04S 2420/11* (2013.01)

(58) Field of Classification Search
CPC ......... H04R 3/00; H04R 3/02; H04S 2400/03; H04S 2420/11; H04S 5/00; H04S 5/005
USPC ................................ 381/26, 91–92, 122, 17
See application file for complete search history.

(56) References Cited

U.S. PATENT DOCUMENTS

2018/0301157 A1* 10/2018 Gunawan .............. G10L 21/034
2019/0014399 A1* 1/2019 Sano ........................ H04R 1/02

FOREIGN PATENT DOCUMENTS

| CN | 101957442 A | 1/2011 |
| CN | 105828266 A | 8/2016 |

* cited by examiner

METHOD AND DEVICE FOR SOUND SOURCE LOCALIZATION

TECHNICAL FIELD

The present disclosure relates to the technical field of sound source localization, and in particular to a method and device for sound source localization.

BACKGROUND

Sound source localization has been widely studied since the 1970s and 1980s. With the development of science and technology, the pursuit of audio quality in various fields is becoming higher and higher. The object of audio research has been gradually transitioned to stereo audio, surround audio, and 3D (3-dimensional) audio from the original mono audio. Unlike single-channel audio, multi-channel audio is usually obtained through microphone arrays. At present, the microphone array sound source localization technology based on Direction of Arrival (DOA) estimation is a research hotspot in many fields, and is widely used in various areas such as sonar, video teleconference, artificial intelligence, seismic research, voice tracking and recognition, monitoring devices, etc.

In existing DOA methods, microphone arrays located in the same plane are mainly detected, and eigenvalue decomposition is performed on covariance matrices of frequency domain signals of the input multiple channels of audio to further estimate the direction of sound source according to the eigenvector corresponding to the maximum eigenvalue. The specific steps are:

a) obtaining multiple channels of audio signals in the same plane;

b) performing time-frequency transform channel-by-channel to obtain frequency domain signals of the multiple channels of audio signals, further calculating a covariance matrix in a specific frequency band and performing smoothing process;

where the time-frequency transform can be realized by techniques such as Discrete Fourier Transform (DFT), Fast Fourier Transform (FFT), Modified Discrete Cosine Transform (MDCT) or the like;

the covariance matrix calculation formula is presented as follows:

$$cov(n) = \sum_{k=k_l}^{k_u} X(n,k) X^H(n,k)$$

where n represents the numbering of an audio frame in the audio signal; k represents the numbering of a frequency point of the frequency domain signal; X(n,k) represents a matrix composed of the value of the k-th frequency point in the n-th frame, specifically $X(n,k)=[X_1(n,k)\ X_2(n,k)\ \ldots\ ]$, $X_i$, i=1,2, . . . is a frequency domain signal of the audio signal; and $k_l$ and $k_u$ are respectively start frequency point and cut-off frequency point of the covariance matrix calculation. The smoothing process is:

$$cov_s(n,k) = \alpha \cdot cov_s(n-1,k) + (1-\alpha) \cdot cov(n,k)$$

where $\alpha$ is a smoothing factor, and $\alpha=0.9$;

c) performing eigenvalue decomposition on the smoothed covariance matrix to obtain eigenvalues and corresponding eigenvectors;

$$[V,D] = eigen(cov_s(n))$$

where V is a matrix with each column representing an eigenvector of $cov_s(n)$ and D is a diagonal matrix with the corresponding eigenvalues sorted in the descending order.

d) estimating the direction of sound source according to the eigenvector corresponding to the maximum eigenvalue, to obtain sound source orientation parameters, e.g. azimuth.

The azimuth is the index of largest value:

$$\theta(n) = \arg\max(pv_1)$$

where $v_1$ is the first column of V, and $pv_1$ is an M by 1 vector with each entry representing the dot product of $v_1$ with a predefined amplitude pattern from a given angle.

For 3D audio containing height information, because the microphone arrays are not in the same plane, using the above existing DOA method directly will ignore the error caused by the height information, thus resulting in inaccurate DOA detection results.

SUMMARY

In view of the deficiencies of the prior art, an object of the present disclosure is to provide a method and a device for sound source localization. For the audio signals of a preset format obtained by microphone arrays located in different planes, the DOA detection is performed in combination with the height information, thereby effectively improving the accuracy of the DOA detection, and solving the problem that the detection result of the existing DOA method is inaccurate. At the same time, the complexity can also be reduced by the adaptive process.

The present disclosure provides the following technical solution:

A method for sound source localization, the method including the following steps:

step 1: obtaining M channels of audio signals of a preset format by using microphone arrays located in different planes, where M is a positive integer;

step 2: preprocessing the M channels of audio signals of the preset format, and projecting them onto a same plane to obtain N channels of audio signals, where N is a positive integer, and M≥N;

step 3: performing time-frequency transform, channel by channel, on the N channels of audio signals to obtain frequency domain signals of the N channels of audio signals;

step 4: calculating covariance matrices of the frequency domain signals, and performing smoothing process on the covariance matrices;

step 5: performing eigenvalue decomposition on the smoothed covariance matrices to obtain N eigenvalues and corresponding eigenvectors; and step 6: estimating the direction of the sound source according to the eigenvector corresponding to the maximum eigenvalue, to obtain sound source orientation parameters, e.g., e.g. azimuth.

Further, in step 1, M=4, and the audio signals of the preset format are audio signals of Ambisonic A format, specifically, four channels of audio signals (LFU, RFD, LBD, RBU) located in different planes.

Further, the specific process of the preprocessing in step 2 is:

converting the four channels of audio signals of the Ambisonic A format into three (N=3) channels of audio signals (L, R, S) in the same plane by a conversion matrix A:

$$\begin{bmatrix} L \\ R \\ S \end{bmatrix} = A \times \begin{bmatrix} LFU \\ RFD \\ LBD \\ RBU \end{bmatrix}$$

where the conversion matrix $$A = \begin{bmatrix} a_{11} & a_{12} & a_{13} & a_{14} \\ a_{21} & a_{22} & a_{23} & a_{24} \\ a_{31} & a_{32} & a_{33} & a_{34} \end{bmatrix},$$

and the values of the elements $a_{11}, a_{12}, \ldots, a_{34}$ of the A are constants and are determined by different sound source scenes, e.g.

$$A = \begin{bmatrix} 0.8415 & 0.0915 & 0.4085 & -0.3415 \\ 0.0915 & 0.8415 & -0.3415 & 0.4085 \\ -0.1830 & -0.1830 & 0.6830 & 0.6830 \end{bmatrix}.$$

Further, the process of the preprocessing in step 2 is:
converting the four channels of audio signals of the Ambisonic A format into four (N=4) channels of audio signals (F, R, B, L) in the same plane by a conversion matrix A:

$$\begin{bmatrix} F \\ R \\ B \\ L \end{bmatrix} = A \times \begin{bmatrix} LFU \\ RFD \\ LBD \\ RBU \end{bmatrix}$$

where the conversion matrix $$A = \begin{bmatrix} f_{11}(\phi) & f_{12}(\phi) & f_{13}(\phi) & f_{14}(\phi) \\ f_{21}(\phi) & f_{22}(\phi) & f_{23}(\phi) & f_{24}(\phi) \\ f_{31}(\phi) & f_{32}(\phi) & f_{33}(\phi) & f_{34}(\phi) \\ f_{41}(\phi) & f_{42}(\phi) & f_{43}(\phi) & f_{44}(\phi) \end{bmatrix},$$

the $\phi$ is a height angle, and $f(\phi)$ is a function related to $\phi$, e.g.

$$A = \begin{bmatrix} \cos\phi & 0 & 0 & 0 \\ 0 & \cos\phi & 0 & 0 \\ 0 & 0 & \cos\phi & 0 \\ 0 & 0 & 0 & \cos\phi \end{bmatrix}.$$

Further, when the microphone array picks up audio, if the sound source is in the middle position ($\phi=0°$), then the conversion matrix $$A = \begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix},$$

and the values of the elements $a_{11}, a_{12}, \ldots, a_{44}$ of the A are constants and are determined by different sound source scenes, e.g.

$$A = \begin{bmatrix} 1 & 0 & 0 & 0 \\ 0 & 1 & 0 & 0 \\ 0 & 0 & 1 & 0 \\ 0 & 0 & 0 & 1 \end{bmatrix}.$$

Further, the process of the preprocessing in step 2 is:
step 21: converting the four channels of audio signals of the Ambisonic A format into audio signals (W, X, Y, Z) of the Ambisonic B format by a conversion matrix A:

$$\begin{bmatrix} W \\ X \\ Y \\ Z \end{bmatrix} = A \times \begin{bmatrix} LFU \\ RFD \\ LBD \\ RBU \end{bmatrix}$$

where the conversion matrix $$A = \begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix},$$

and the values of the elements $a_{11}, a_{12}, \ldots, a_{44}$ of the A are constants and are determined by different sound source scenes, e.g.

$$A = \begin{bmatrix} \frac{1}{2} & \frac{1}{2} & \frac{1}{2} & \frac{1}{2} \\ \frac{\sqrt{3}}{2} & \frac{\sqrt{3}}{2} & -\frac{\sqrt{3}}{2} & -\frac{\sqrt{3}}{2} \\ \frac{\sqrt{3}}{2} & -\frac{\sqrt{3}}{2} & \frac{\sqrt{3}}{2} & -\frac{\sqrt{3}}{2} \\ \frac{\sqrt{3}}{2} & -\frac{\sqrt{3}}{2} & -\frac{\sqrt{3}}{2} & \frac{\sqrt{3}}{2} \end{bmatrix}.$$

step 22: estimating a divergence parameter based on an energy of a Z signal in the audio signals of the B format;
step 23: determining whether the divergence is greater than a set threshold; and
step 24: if the divergence is greater than the set threshold, estimating the direction of sound source by using three (N=3) channels of audio signals (L, R, S); and
if the divergence is not greater than the set threshold, estimating the direction of sound source by using four (N=4) channels of audio signals (F, R, B, L).

Further, the time-frequency transform in step 3 can be realized by Discrete Fourier Transform (DFT), Fast Fourier Transform (FFT) or Modified Discrete Cosine Transform (MDCT).

Further, the specific process of estimating the direction of the sound source in step 6 is:
searching for, according to the maximum eigenvector, an index value corresponding to a maximum inner product value by using the inner product of the maximum eigenvector and a steering vector, where the index value corresponds to the direction of sound source.

Further, in step 3, the obtained frequency domain signals are divided into several sub-bands;

in step 4, a covariance matrix is calculated for each of the sub-bands and smoothing process is performed;

in step 5, eigenvalue decomposition is respectively performed on the covariance matrices of the several sub-bands after the smoothing process to obtain N eigenvalues and corresponding eigenvectors of the covariance matrix of each sub-band; and in step 6, the direction of the sound source is estimated for each sub-band according to the eigenvector corresponding to the maximum eigenvalue, and sound source orientation parameters are obtained in combination with the detection results for each sub-band.

A device for sound source localization is provided, which includes an acquisition unit of audio signal of a preset format, a signal preprocessing unit, a time-frequency transform unit, a frequency domain signal processing unit, and a sound source orientation estimation unit, wherein:

the acquisition unit of audio signal of a preset format is configured to obtain M channels of audio signals of a preset format by using microphone arrays located in different planes, and send the M channels of audio signals of the preset format to the signal preprocessing unit;

the signal preprocessing unit is configured to preprocess the received M channels of audio signals of the preset format and project them onto a same plane to obtain N channels of audio signals, and send the N channels of audio signals to the time-frequency transform unit;

the time-frequency transform unit is configured to perform time-frequency transform on the received N channels of audio signals, channel by channel, to obtain frequency domain signals of the N channels of audio signals;

the frequency domain signal processing unit is configured to process the frequency domain signals, calculate covariance matrices of the frequency domain signals and perform smoothing process, further perform eigenvalue decomposition on the covariance matrices, and send the obtained eigenvalues and eigenvectors to the sound source orientation estimation unit; and the sound source orientation estimation unit is configured to estimate the direction of sound source according to the eigenvector corresponding to the maximum eigenvalue of the eigenvalues, to obtain sound source orientation parameters, e.g. azimuth.

The method and device of the present disclosure have the following advantages:

In combination with the height information for DOA detection, the accuracy of DOA detection can be effectively improved, and according to the divergence parameter obtained through estimation of the energy of the Z signal, DOA detection can be adaptively performed on the input multiple channels of audio and the accuracy of DOA detection can be determined, at the same time, the complexity can also be reduced by the adaptive process. Errors caused by height information can be effectively excluded, thereby improving resolution in the horizontal direction.

DETAILED DESCRIPTION OF THE EMBODIMENTS

In order to enable those skilled in the art to better understand the technical solutions of the present disclosure, the technical solutions of the embodiments of the present disclosure will be clearly and completely described below in combination with the accompanying drawings of the embodiments of the present disclosure. It is apparent that the described embodiments are part of the embodiments of the present disclosure, instead of all of them. All the other embodiments obtained by those skilled in the art on the basis of the embodiments of the present disclosure without creative efforts will fall within the scope of protection of the present disclosure.

Figure 1:
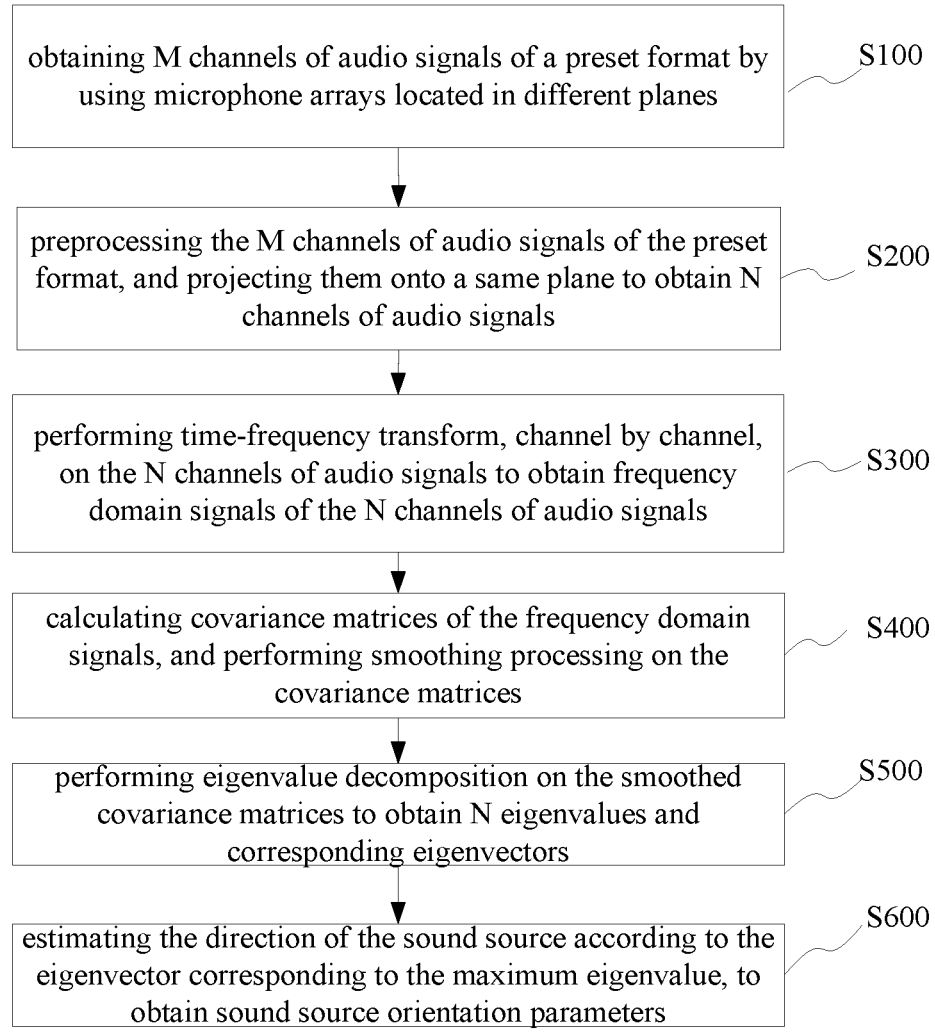
FIG. 1 is a schematic flowchart of a method for sound source localization according to a preferred embodiment of the present disclosure.

With reference to FIG. 1, a method for sound source localization is provided according to an embodiment of the present disclosure, which includes the following steps S100-S600.

Step S100: obtaining M channels of audio signals of a preset format by using microphone arrays located in different planes.

Figure 2:
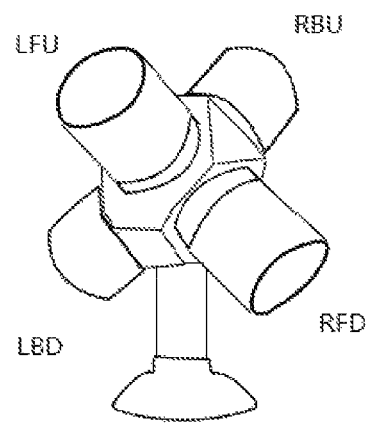
FIG. 2 is a schematic diagram of four channels of audio signals in a preferred embodiment of the present disclosure.

In the embodiment, the M channels of audio signals of the preset format may be four channels of audio signals (LFU, RFD, LBD, RBU) of Ambisonic A format. See FIG. 2.

Step S200: preprocessing the M channels of audio signals of the preset format, and projecting them onto a same plane to obtain N channels of audio signals.

Figure 3:
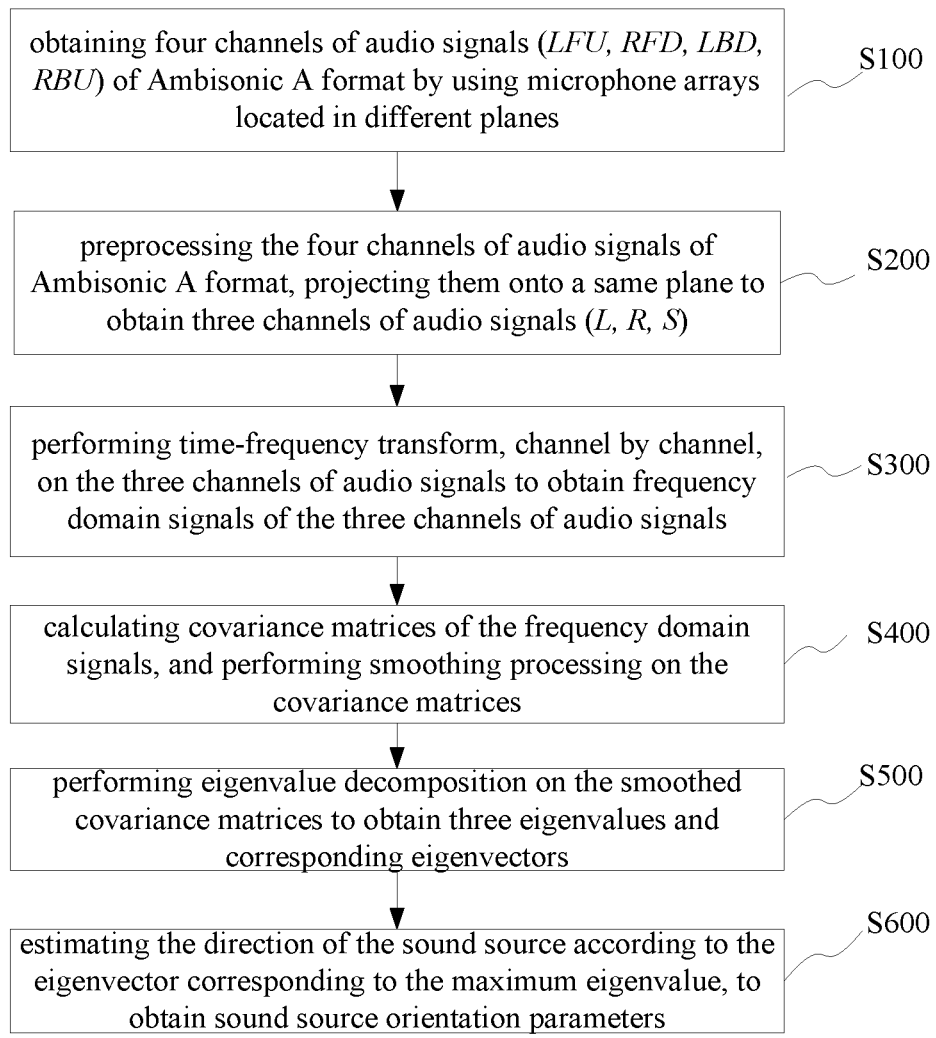
FIG. 3 is a schematic flowchart of a method for sound source localization according to another preferred embodiment of the present disclosure.

In the embodiment, referring to FIG. 3, the four channels of audio signals of the Ambisonic A format can be converted into three (N=3) channels of audio signals (L, R, S) in the same plane by a conversion matrix A:

$$\begin{bmatrix} L \\ R \\ S \end{bmatrix} = A \times \begin{bmatrix} LFU \\ RFD \\ LBD \\ RBU \end{bmatrix}$$

where the conversion matrix $$A = \begin{bmatrix} a_{11} & a_{12} & a_{13} & a_{14} \\ a_{21} & a_{22} & a_{23} & a_{24} \\ a_{31} & a_{32} & a_{33} & a_{34} \end{bmatrix},$$

and the values of the elements $a_{11}, a_{12}, \ldots, a_{34}$ of the A are constants and are determined by different sound source scenes, e.g.

$$A = \begin{bmatrix} 0.8415 & 0.0915 & 0.4085 & -0.3415 \\ 0.0915 & 0.8415 & -0.3415 & 0.4085 \\ -0.1830 & -0.1830 & 0.6830 & 0.6830 \end{bmatrix}$$

By converting the audio signals of the Ambisonic A format into audio signals of the LRS format, errors caused by height information can be excluded and a more accurate detection result can be obtained.

Figure 4:
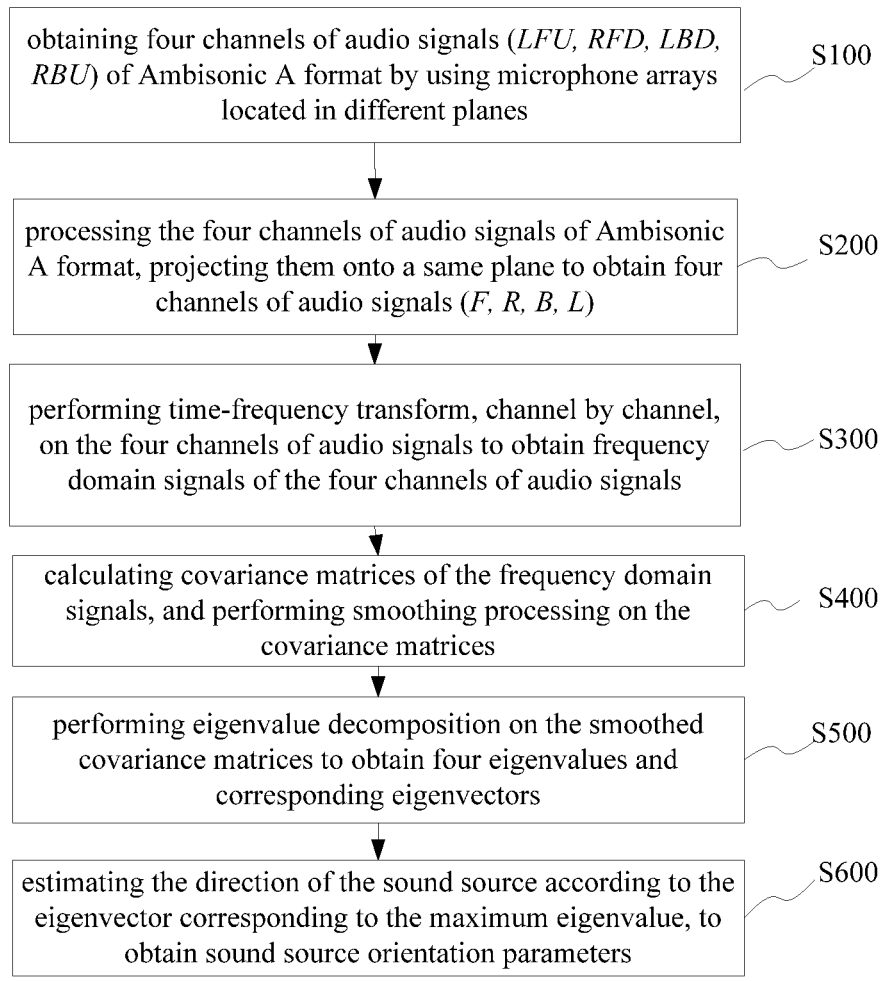
FIG. 4 is a schematic flowchart of a method for sound source localization according to another preferred embodiment of the present disclosure.

In an embodiment of the present disclosure, referring to FIG. 4, the four channels of audio signals of the Ambisonic A format can also be converted into four (N=4) channels of audio signals (F, R, B, L) in the same plane by a conversion matrix A:

$$\begin{bmatrix} F \\ R \\ B \\ L \end{bmatrix} = A \times \begin{bmatrix} LFU \\ RFD \\ LBD \\ RBU \end{bmatrix}$$

where the conversion matrix $$A = \begin{bmatrix} f_{11}(\phi) & f_{12}(\phi) & f_{13}(\phi) & f_{14}(\phi) \\ f_{21}(\phi) & f_{22}(\phi) & f_{23}(\phi) & f_{24}(\phi) \\ f_{31}(\phi) & f_{32}(\phi) & f_{33}(\phi) & f_{34}(\phi) \\ f_{41}(\phi) & f_{42}(\phi) & f_{43}(\phi) & f_{44}(\phi) \end{bmatrix},$$

the $\phi$ is a height angle, and $f(\phi)$ is a function related to $\phi$, e.g.

$$A = \begin{bmatrix} \cos\phi & 0 & 0 & 0 \\ 0 & \cos\phi & 0 & 0 \\ 0 & 0 & \cos\phi & 0 \\ 0 & 0 & 0 & \cos\phi \end{bmatrix}.$$

When the microphone array picks up audio, if the sound source is in the middle position, then the audio as picked up contains no height information ($\phi=0°$), the conversion matrix $$A = \begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix},$$

and the values of the elements $a_{11}, a_{12}, \ldots, a_{44}$ of the A are constants and are determined by different sound source scenes, e.g.

$$A = \begin{bmatrix} 1 & 0 & 0 & 0 \\ 0 & 1 & 0 & 0 \\ 0 & 0 & 1 & 0 \\ 0 & 0 & 0 & 1 \end{bmatrix}.$$

By using the four-channel audio detection method, the resolution in the horizontal direction can be effectively improved.

Step S300: performing time-frequency transform, channel by channel, on the N channels of audio signals to obtain frequency domain signals of the N channels of audio signals.

In the embodiment, the time-frequency transform can be realized by Discrete Fourier Transform (DFT), Fast Fourier Transform (FFT) or Modified Discrete Cosine Transform (MDCT).

Step S400: calculating covariance matrices of the frequency domain signals, and performing smoothing process on the covariance matrices.

In the embodiment, the calculation of the covariance matrix can be set in a specific frequency band, or the covariance matrix of each sub-band can be calculated separately after dividing the entire frequency band into sub-bands.

The formula for calculating the covariance matrix for a particular frequency band is:

$$\mathrm{cov}(n,k) = \sum_{k=k_l}^{k_H} X(n,k) X^H(n,k)$$

where n represents the numbering of an audio frame in the audio signal; k represents the numbering of a frequency point of the frequency domain signal; X(n,k) represents a matrix composed of the value of the k-th frequency point in the n-th frame, specifically $X(n,k)=[X_1(n,k)\ X_2(n,k)\ \ldots\ ]$, $X_i$, i=1,2, ..., N is a frequency domain signal of the audio signal; and $k_l$ and $k_u$ are respectively start frequency point and cut-off frequency point of the covariance matrix calculation.

The smoothing process is:

$$\mathrm{cov}_s(n,k)=\alpha\square\mathrm{cov}_s(n-1,k)+(1-\alpha)\square\mathrm{cov}(n,k)$$

where $\alpha$ is a smoothing factor, and can be set at a fixed value, e.g., $\alpha=0.9$, or also may be selected adaptively according to the characteristics of the audio signal.

Step S500: performing eigenvalue decomposition on the smoothed covariance matrices to obtain N eigenvalues and corresponding eigenvectors.

Step S600: estimating the direction of the sound source according to the eigenvector corresponding to the maximum eigenvalue, to obtain sound source orientation parameters.

In the embodiment, the estimation of the direction of the sound source according to the eigenvector corresponding to the maximum eigenvalue can be specifically performed as follows:

searching for an index value corresponding to a maximum inner product value by using the inner product of the maximum eigenvector and a steering vector, where the index value corresponds to the direction of sound source.

The steering vector is:

$$P = \begin{bmatrix} p_1 \\ p_2 \\ \vdots \\ p_K \end{bmatrix}$$

where K is the order of the steering vector, and is typically determined by the locating accuracy.

For three channels of audio signals, the value of $p_k$, k=1,2, ..., K is determined by the following formula:

$$p_k = \left[0.5 + 0.5\cos\left(\frac{2\pi k}{M} - \frac{\pi}{3}\right)\right]\left[0.5 + 0.5\cos\left(\frac{2\pi k}{M} + \frac{\pi}{3}\right)\right]\left[0.5 + 0.5\cos\left(\frac{2\pi k}{M} - \pi\right)\right]$$

For four channels of audio signals, the value of $p_k$, $k=1,2,\ldots,K$ is determined by the following formula:

$$p_k = \left[0.5 + 0.5\cos\left(\frac{2\pi k}{M}\right)\right]\left[0.5 + 0.5\cos\left(\frac{2\pi k}{M} + \frac{\pi}{2}\right)\right]\left[0.5 + 0.5\cos\left(\frac{2\pi k}{M} + \pi\right)\right]\left[0.5 + 0.5\cos\left(\frac{2\pi k}{M} + \frac{3\pi}{2}\right)\right]$$

The inner product D of the maximum eigenvector V and the steering vector P is:

$$D = P \cdot V$$

In the embodiment of the present disclosure, the frequency domain signals obtained in step S300 can also be divided into several sub-bands. In step S400, a covariance matrix is calculated for each of the sub-bands and smoothing process is performed. In step S500, eigenvalue decomposition is respectively performed on the covariance matrices of the several sub-bands after the smoothing process to obtain N eigenvalues and corresponding eigenvectors of the covariance matrix of each sub-band. In step S600, the direction of the sound source is estimated for each sub-band according to the eigenvector corresponding to the maximum eigenvalue, and sound source orientation parameters are obtained in combination with the detection results for each sub-band.

Figure 5:
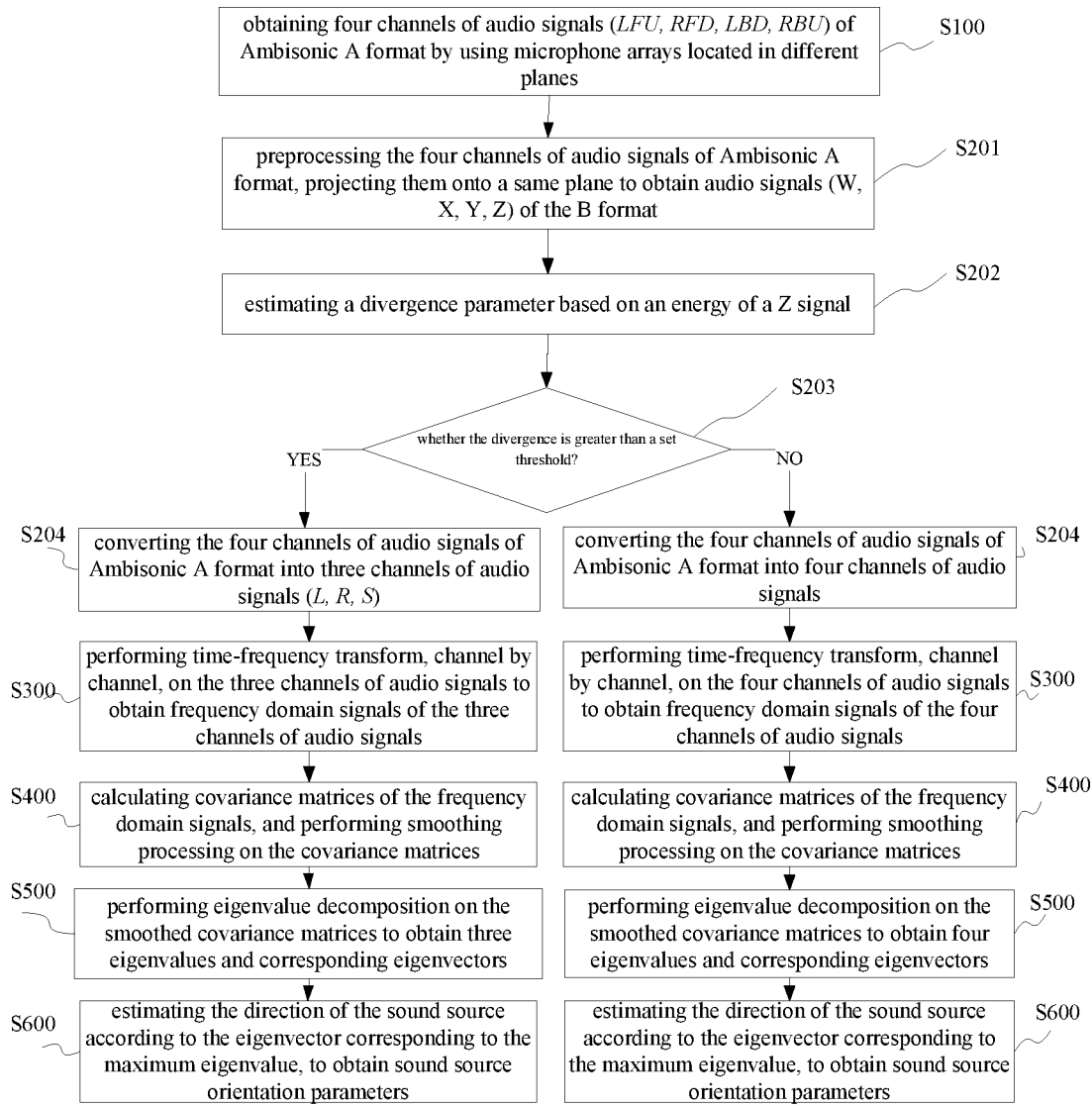
FIG. 5 is a schematic flowchart of a method for sound source localization according to still another preferred embodiment of the present disclosure.

In the embodiment of the present disclosure, the DOA detection can also be performed adaptively on the four channels of audio signals of Ambisonic A format according to the divergence parameter, as shown in FIG. 5, and the specific steps are as follows:

Step S100: obtaining four channels of audio signals (LFU, RFD, LBD, RBU) of Ambisonic A format by using microphone arrays located in different planes.

Step S200: preprocessing the four channels of audio signals of Ambisonic A format, projecting them onto a same plane to obtain four channels of audio signals (W, X, Y, Z) of the B format in the same plane, and determining whether the three (N=3) channels of audio (L, R, S) or the four (N=4) channels of audio will be used to estimate the direction of sound source, according to the four channels of audio signals of the B format.

In the embodiment, the specific preprocessing steps are as follows:

Step S201: converting the four channels of audio signals of the Ambisonic A format into audio signals (W, X, Y, Z) of the Ambisonic B format by a conversion matrix A:

$$\begin{bmatrix} W \\ X \\ Y \\ Z \end{bmatrix} = A \times \begin{bmatrix} LFU \\ RFD \\ LBD \\ RBU \end{bmatrix}$$

where the conversion matrix $$A = \begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix},$$

and the values of the elements $a_{11}, a_{12}, \ldots, a_{44}$ of the A are constants and are determined by different sound source scenes, e.g.

$$A = \begin{bmatrix} \frac{1}{2} & \frac{1}{2} & \frac{1}{2} & \frac{1}{2} \\ \frac{\sqrt{3}}{2} & \frac{\sqrt{3}}{2} & -\frac{\sqrt{3}}{2} & -\frac{\sqrt{3}}{2} \\ \frac{\sqrt{3}}{2} & -\frac{\sqrt{3}}{2} & \frac{\sqrt{3}}{2} & -\frac{\sqrt{3}}{2} \\ \frac{\sqrt{3}}{2} & -\frac{\sqrt{3}}{2} & -\frac{\sqrt{3}}{2} & \frac{\sqrt{3}}{2} \end{bmatrix}.$$

Step S202: estimating a divergence parameter based on an energy of a signal in the audio signals of the B format.

$$a_{diff} = \frac{P_z}{P_w}$$

where, Pz and Pw are the powers of Z signal and W signal respectively.

Step S203: determining whether the divergence is greater than a set threshold, wherein the threshold is set by an empirical value according to different scenes.

In the embodiment of the present disclosure, the range of the value of the threshold may be [0.3, 0.6].

Step S204: if the divergence is greater than the set threshold, using the three (N=3) channels of audio signals (L, R, S) to estimate the direction of sound source; and if the divergence is not greater than the set threshold, using the four (N=4) channels of audio signals to estimate the direction of sound source.

Step S300: performing time-frequency transform, channel by channel, on the N channels of audio signals to obtain frequency domain signals of the N channels of audio signals.

In the embodiment, the time-frequency transform can be realized by Discrete Fourier Transform (DFT), Fast Fourier Transform (FFT) or Modified Discrete Cosine Transform (MDCT).

Step S400: calculating covariance matrices of the frequency domain signals, and performing smoothing process on the covariance matrices.

In the embodiment, the calculation of the covariance matrix can be set in a specific frequency band, or the covariance matrix of each sub-band can be calculated separately after dividing the full frequency band into sub-bands.

Step S500: performing eigenvalue decomposition on the smoothed covariance matrices to obtain N eigenvalues and corresponding eigenvectors.

Step S600: estimating the direction of the sound source according to the eigenvector corresponding to the maximum eigenvalue, to obtain sound source orientation parameters.

In the embodiment, the estimation of the direction of the sound source according to the eigenvector corresponding to the maximum eigenvalue can be specifically performed as follows:

searching for an index value corresponding to a maximum inner product value by using the inner product of the maximum eigenvector and a steering vector, where the index value corresponds to the direction of sound source.

In the present embodiment, the divergence parameter can also be used as a reference for the confidence of the DOA result. When the divergence parameter is small, the DOA result has a high confidence; and when the divergence parameter is large, the DOA result has a small confidence.

In the embodiment, the DOA detection is adaptively performed on the input multiple channels of audio signals based on the divergence parameter obtained through the estimation of the energy of Z signal, and the accuracy of orientation can be improved at a lower complexity.

Figure 6:
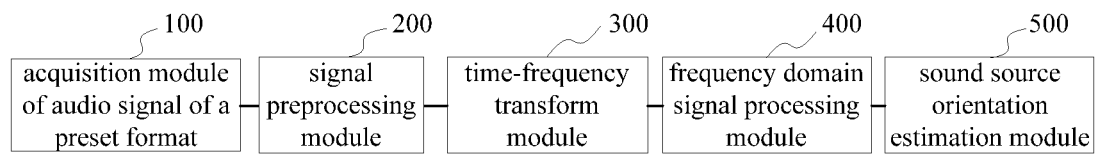
FIG. 6 is a functional unit diagram of a device for sound source localization according to a preferred embodiment of the present disclosure.

With reference to FIG. 6, a device for sound source localization is provided, which includes an acquisition unit 100 of audio signal of a preset format, a signal preprocessing unit 200, a time-frequency transform unit 300, a frequency domain signal processing unit 400, and a sound source orientation estimation unit 500.

The acquisition unit 100 of audio signal of a preset format is configured to obtain M channels of audio signals of a preset format by using microphone arrays located in different planes, and send the M channels of audio signals of the preset format to the signal preprocessing unit 200.

The signal preprocessing unit 200 is configured to preprocess the received M channels of audio signals of the preset format and project them onto a same plane to obtain N channels of audio signals, and send the N channels of audio signals to the time-frequency transform unit 300.

The time-frequency transform unit 300 is configured to perform time-frequency transform on the received N channels of audio signals, channel by channel, to obtain frequency domain signals of the N channels of audio signals, and send the frequency domain signals of the N channels of audio signals to the frequency domain signal processing unit 400.

The frequency domain signal processing unit 400 is configured to process the frequency domain signals of the N channels of audio signals, calculate covariance matrices of the frequency domain signals and perform smoothing process, further perform eigenvalue decomposition on the covariance matrices, and send the obtained eigenvalues and eigenvectors to the sound source orientation estimation unit 500.

The sound source orientation estimation unit 500 is configured to estimate the direction of sound source according to the eigenvector corresponding to the maximum eigenvalue of the eigenvalues, to obtain sound source orientation parameters.

In the device disclosed in the embodiment, the Ambisonic audio signals located in different planes are projected onto the same plane for detection, which can effectively improve the accuracy of the DOA detection.

The above description of various embodiments of the present disclosure is provided to those skilled in the art for the purpose of illustration. It is not intended to be exhaustive or to limit the present disclosure to the single disclosed embodiment. As described above, various alternatives and modifications to the present disclosure will be apparent to those skilled in the art. Thus, while a few alternative embodiments have been discussed in detail, other embodiments will be apparent to or can be readily obtained by those skilled in the art. The present disclosure is intended to cover all the alternatives, modifications, and variations of the present disclosure discussed above, as well as other embodiments that fall within the spirit and scope of the present disclosure.

What is claimed is:

1. A method for locating a sound source comprising:

step 1: obtaining M channels of audio signals of a preset format by using microphone arrays located on different planes, wherein M is a positive integer;

step 2: preprocessing the M channels of audio signals of the preset format, and projecting the M channels of audio signals of the preset format onto a same plane to obtain N channels of audio signals, wherein N is a positive integer, and M≥N;

step 3: performing a time-frequency transform on each of the N channels of audio signals to obtain frequency domain signals of the N channels of audio signals;

step 4: calculating covariance matrices of the frequency domain signals, and performing a smoothing process on each of the covariance matrices to obtain smoothed covariance matrices;

step 5: performing an eigenvalue decomposition on each of the smoothed covariance matrices to obtain N eigenvalues and corresponding eigenvectors; and step 6: estimating a direction of the sound source according to an eigenvector corresponding to a maximum eigenvalue of the N eigenvalues, to obtain sound source orientation parameters, wherein in the step 1, M=4, the preset format is an Ambisonic A format, and the four channels of audio signals (LFU, RFD, LBD, RBU) are located on different planes, wherein a specific process of the preprocessing in the step 2 is:

converting he four channels of audio signals of the Ambisonic A format into three (N=3) channels of audio signals (L, R, S) in the same plane by a conversion matrix A:

$$\begin{bmatrix} L \\ R \\ S \end{bmatrix} = A \times \begin{bmatrix} LFU \\ RFD \\ LBD \\ RBU \end{bmatrix}$$

wherein the conversion matrix $$A = \begin{bmatrix} a_{11} & a_{12} & a_{13} & a_{14} \\ a_{21} & a_{22} & a_{23} & a_{24} \\ a_{31} & a_{32} & a_{33} & a_{34} \end{bmatrix},$$

and values of elements $a_{11}, a_{12}, \ldots, a_{34}$ of the conversion matrix A are constants and are determined by different sound source scenes.

2. The method for locating the sound source according to claim 1, wherein a process of the preprocessing in the step 2 is:

converting the four channels of audio signals of the Ambisonic A format into four (N=4) channels of audio signals (F, R, B, L) in the same plane by the conversion matrix A:

$$\begin{bmatrix} F \\ R \\ B \\ L \end{bmatrix} = A \times \begin{bmatrix} LFU \\ RFD \\ LBD \\ RBU \end{bmatrix}$$

wherein the conversion matrix $$A = \begin{bmatrix} f_{11}(\phi) & f_{12}(\phi) & f_{13}(\phi) & f_{14}(\phi) \\ f_{21}(\phi) & f_{22}(\phi) & f_{23}(\phi) & f_{24}(\phi) \\ f_{31}(\phi) & f_{32}(\phi) & f_{33}(\phi) & f_{34}(\phi) \\ f_{41}(\phi) & f_{42}(\phi) & f_{43}(\phi) & f_{44}(\phi) \end{bmatrix},$$

$\phi$ is a height angle, and $f(\phi)$ is a function related to $\phi$.

3. The method for locating the sound source according to claim 2, wherein when the microphone arrays pick up the audio signals, if the sound source is in a middle position ($\phi=0°$), the conversion matrix $$A = \begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix},$$

and values of elements $a_{11}, a_{12}, \ldots, a_{44}$ of the conversion matrix A are constants and are determined by different sound source scenes.

4. The method for locating the sound source according to claim 1, wherein a process of the preprocessing in the step 2 is:
step 21: converting the four channels of audio signals of the Ambisonic A format into audio signals (W, X, Y, Z) of an Ambisonic B format by the conversion matrix A:

$$\begin{bmatrix} W \\ X \\ Y \\ Z \end{bmatrix} = A \times \begin{bmatrix} LFU \\ RFD \\ LBD \\ RBU \end{bmatrix}$$

wherein the conversion matrix $$A = \begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix},$$

and values of elements $a_{11}, a_{12}, \ldots, a_{44}$ of the conversion matrix A are constants and are determined by different sound source scenes;
step 22: estimating a parameter of a divergence based on an energy of a Z signal in the audio signals of the Ambisonic B format;
step 23: determining whether the divergence is greater than a set threshold; and
step 24: if the divergence is greater than the set threshold, estimating the direction of the sound source by using three (N=3) channels of audio signals (L, R, S); and
if the divergence is not greater than the set threshold, estimating the direction of the sound source by using four (N=4) channels of audio signals (F, R, B, L).

5. The method for locating the sound source according to claim 1, wherein the time-frequency transform in the step 3 is realized by a Discrete Fourier Transform (DFT), a Fast Fourier Transform (FFT) or a Modified Discrete Cosine Transform (MDCT).

6. The method for locating the sound source according to claim 1, wherein a specific process of estimating the direction of the sound source in the step 6 is:
searching for, according to the eigenvector corresponding to the maximum eigenvalue of the N eigenvalues, an index value corresponding to a maximum inner product value by using an inner product of the eigenvector corresponding to the maximum eigenvalue of the N eigenvalues and a steering vector, wherein the index value corresponds to the direction of the sound source.

7. The method for locating the sound source according to claim 1, wherein:
in the step 3, the frequency domain signals are divided into a plurality of sub-bands;
in the step 4, the covariance matrices are calculated for the plurality of sub-bands and the smoothing process is performed;
in the step 5, the eigenvalue decomposition is respectively performed on the covariance matrices of the plurality of sub-bands after the smoothing process to obtain N eigenvalues and corresponding eigenvectors of the covariance matrices of the plurality of sub-bands; and
in the step 6, the direction of the sound source is estimated for each sub-band of the plurality of sub-bands according to the eigenvector corresponding to the maximum eigenvalue, and the sound source orientation parameters are obtained in combination with detection results of the direction of the sound source for the each sub-band.

8. A device for locating a sound source, comprising: an acquisition unit of an audio signal of a preset format, a signal preprocessing unit, a time-frequency transform unit, a frequency domain signal processing unit, and a sound source orientation estimation unit, wherein
the acquisition unit of the audio signal of the preset format is configured to obtain M channels of audio signals of the preset format by using microphone arrays located on different planes, and send the M channels of audio signals of the preset format to the signal preprocessing unit, wherein M is a positive integer and M=4;
the signal preprocessing unit is configured to preprocess the M channels of audio signals of the preset format and project the M channels of audio signals of the preset format onto a same plane to obtain N channels of audio signals, and send the N channels of audio signals to the time-frequency transform unit, wherein N is a positive integer, and M≥N;
the time-frequency transform unit is configured to perform a time-frequency transform on each of the N channels of audio signals to obtain frequency domain signals of the N channels of audio signals;
the frequency domain signal processing unit is configured to process the frequency domain signals, calculate covariance matrices of the frequency domain signals and perform a smoothing process, further perform an eigenvalue decomposition on the covariance matrices to obtain eigenvalues and eigenvectors, and send the eigenvalues and eigenvectors to the sound source orientation estimation unit; and the sound source orientation estimation unit is configured to estimate a direction of the sound source according to an eigenvector corresponding to a maximum eigenvalue of the eigenvalues, to obtain sound source orientation parameters, wherein the preset format is an Ambisonic A format, and four channels of audio signals (LFU, RFD, LBD, RBU) are located on the different planes, wherein the signal preprocessing unit is configured to convert the four channels of audio signals of the Ambisonic A format into three (N=3) channels of audio signals (L, R, S) in the same plane by a conversion matrix A:

$$\begin{bmatrix} L \\ R \\ S \end{bmatrix} = A \times \begin{bmatrix} LFU \\ RFD \\ LBD \\ RBU \end{bmatrix}$$

wherein the conversion matrix $$A = \begin{bmatrix} a_{11} & a_{12} & a_{13} & a_{14} \\ a_{21} & a_{22} & a_{23} & a_{24} \\ a_{31} & a_{32} & a_{33} & a_{34} \end{bmatrix},$$

and values of elements $a_{11}, a_{12}, \ldots, a_{34}$ of the conversion matrix A are constants and are determined by different sound source scenes.

* * * * *